(12) United States Patent
Yazdi

(10) Patent No.: US 10,302,455 B2
(45) Date of Patent: May 28, 2019

(54) MODULES, SYSTEMS, AND METHODS FOR MONITORING ENVIRONMENTAL CONDITIONS

(71) Applicant: Navid Yazdi, Ann Arbor, MI (US)

(72) Inventor: Navid Yazdi, Ann Arbor, MI (US)

(73) Assignee: BelluTech LLC, Ann Arbor, MI (US)

( * ) Notice: Subject to any disclaimer, the term of this patent is extended or adjusted under 35 U.S.C. 154(b) by 191 days.

(21) Appl. No.: 15/281,230

(22) Filed: Sep. 30, 2016

(65) Prior Publication Data

US 2017/0102249 A1    Apr. 13, 2017

Related U.S. Application Data

(60) Provisional application No. 62/284,808, filed on Oct. 9, 2015.

(51) Int. Cl.
*G01D 5/12* (2006.01)
*H01H 1/00* (2006.01)
(Continued)

(52) U.S. Cl.
CPC .............. *G01D 5/12* (2013.01); *G01D 5/251* (2013.01); *H01H 1/0036* (2013.01);
(Continued)

(58) Field of Classification Search
CPC .............. G01N 33/00; G01N 2033/00; G01N 21/3554; G01N 25/56; G01N 27/048;
(Continued)

(56) References Cited

U.S. PATENT DOCUMENTS 3,582,728 A * 6/1971 Thoma ................. G01N 27/225
361/286
3,791,792 A * 2/1974 Lindsay .............. B29C 35/0288
264/408
(Continued)

FOREIGN PATENT DOCUMENTS

JP    20080238330    10/2008

OTHER PUBLICATIONS

International Search Report and Written Opinion dated Jan. 10, 2017, for PCT/US16/55887 filed Oct. 7, 2016.

*Primary Examiner* — Harshad R Patel
*Assistant Examiner* — Tran M. Tran
(74) *Attorney, Agent, or Firm* — Hartman Global IP Law; Gary M. Hartman; Domenica N. S. Hartman

(57) ABSTRACT

Modules, systems, and methods for monitoring environmental conditions, such as physical, electromagnetic, thermal, and/or chemical parameters within an environment, over extended periods of time with the use of one or more electromechanical sensing devices that include a sensing device and electronic circuitry for processing an output of the sensing device and generating a output of the module. The sensing device includes a microstructure, for example, a cantilevered beam, and at least one set of contacts configured for contact-mode operation with the microstructure in response to the microstructure deflecting toward or away from the contacts when exposed to the parameter of interest. The microstructure has a stack of layers of dissimilar materials, at least one of which has at least one property that changes as a result of curing of or absorption by the first material when exposed to the parameter.

50 Claims, 3 Drawing Sheets

(51) Int. Cl.
*H01H 35/00* (2006.01)
*G01D 5/251* (2006.01)
*H01H 35/42* (2006.01)
*H01H 37/00* (2006.01)

(52) U.S. Cl.
CPC ............ *H01H 35/00* (2013.01); *H01H 35/42* (2013.01); *H01H 2037/008* (2013.01); *H01H 2300/032* (2013.01); *Y02B 90/224* (2013.01); *Y04S 20/14* (2013.01)

(58) Field of Classification Search
CPC .. G01N 27/121; G01N 27/223; G01N 31/222; G01N 2223/613; G01N 2223/61; G01D 5/54; G01D 5/56; H01H 35/42
See application file for complete search history.

(56) References Cited

U.S. PATENT DOCUMENTS

| | | | | |
|---|---|---|---|---|
| 4,868,447 A * | 9/1989 | Lee | ............... | H01L 41/047 310/316.01 |
| 5,432,435 A * | 7/1995 | Strong | ............... | G01N 27/041 324/693 |
| 5,872,447 A * | 2/1999 | Hager, III | ............... | G01N 22/00 324/637 |
| 6,203,983 B1 * | 3/2001 | Quate | ............... | C12Q 1/6816 435/6.19 |
| 6,953,977 B2 * | 10/2005 | Mlcak | ............... | B81B 3/0089 257/414 |
| 7,239,064 B1 * | 7/2007 | Jenkins | ............... | B81B 3/0078 310/307 |
| 7,495,368 B2 | 2/2009 | Gogoi et al. | | |
| 7,560,070 B1 * | 7/2009 | Baller | ............... | G01N 33/54373 422/50 |
| 7,619,346 B2 * | 11/2009 | Yazdi | ............... | G01K 1/024 310/307 |
| 7,635,091 B2 * | 12/2009 | Engler | ............... | G01N 27/223 236/44 C |
| 7,772,745 B2 * | 8/2010 | Kawakubo | ............... | H01G 5/18 310/330 |
| 7,800,278 B2 * | 9/2010 | Ujihara | ............... | F03G 7/065 310/306 |
| 7,827,660 B2 | 11/2010 | Gogoi et al. | | |
| 7,907,037 B2 | 3/2011 | Yazdi | | |
| 7,956,759 B1 * | 6/2011 | Kim | ............... | G06K 19/0717 310/307 |
| 8,171,795 B1 * | 5/2012 | Mutharasan | ............... | G01H 11/08 73/579 |
| 8,199,020 B1 * | 6/2012 | Kim | ............... | G01K 1/024 310/307 |
| 8,237,324 B2 * | 8/2012 | Pei | ............... | H01L 41/094 310/306 |
| 8,487,508 B2 | 7/2013 | Yazdi | | |
| 8,528,397 B2 * | 9/2013 | Stamper | ............... | G01M 3/045 73/152.59 |
| 8,593,036 B2 * | 11/2013 | Boysel | ............... | H01L 41/1136 310/339 |
| 8,677,802 B2 | 3/2014 | Hower et al. | | |
| 9,291,511 B2 * | 3/2016 | Gibson | ............... | G01L 5/0052 |
| 9,453,501 B2 * | 9/2016 | Mather | ............... | F03G 7/065 |
| 9,972,763 B2 * | 5/2018 | Zhan | ............... | H02N 3/00 |
| 2009/0320992 A1 * | 12/2009 | Xu | ............... | F03G 7/065 156/155 |
| 2011/0009773 A1 | 1/2011 | Hower et al. | | |
| 2011/0132449 A1 | 6/2011 | Ramadas et al. | | |
| 2014/0179040 A1 * | 6/2014 | Ramadas | ............... | H05B 33/04 438/27 |
| 2016/0156287 A1 * | 6/2016 | Yang | ............... | H01L 41/1136 310/339 |

* cited by examiner

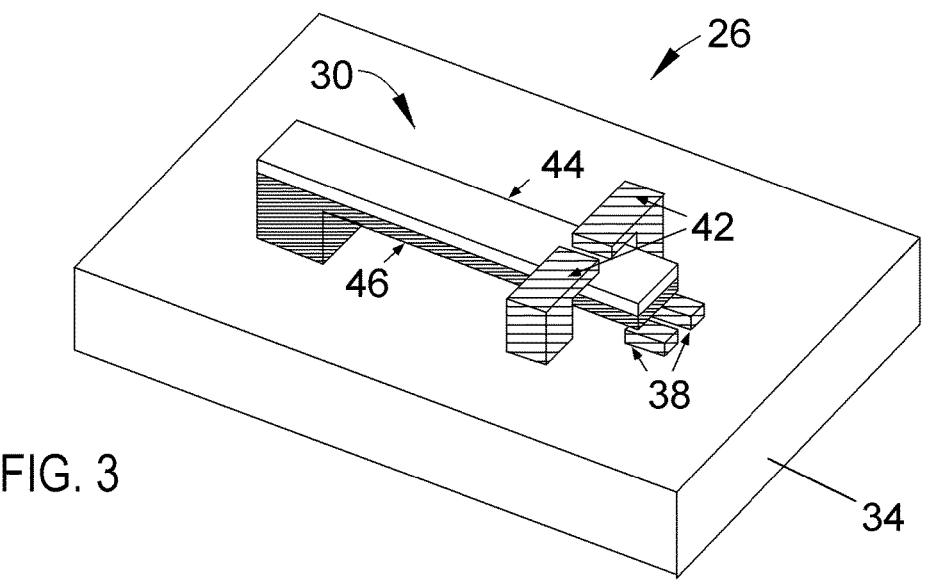
FIG. 3
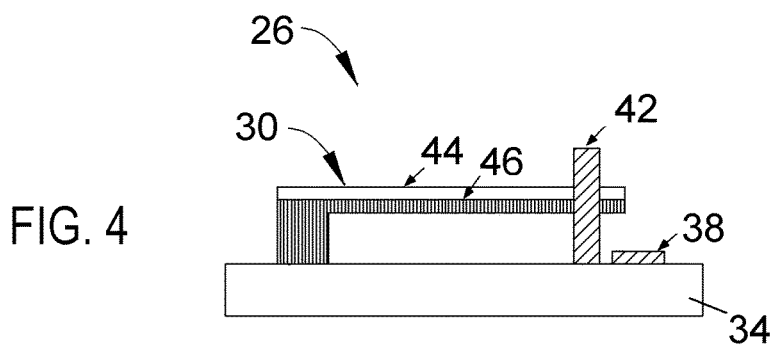
FIG. 4
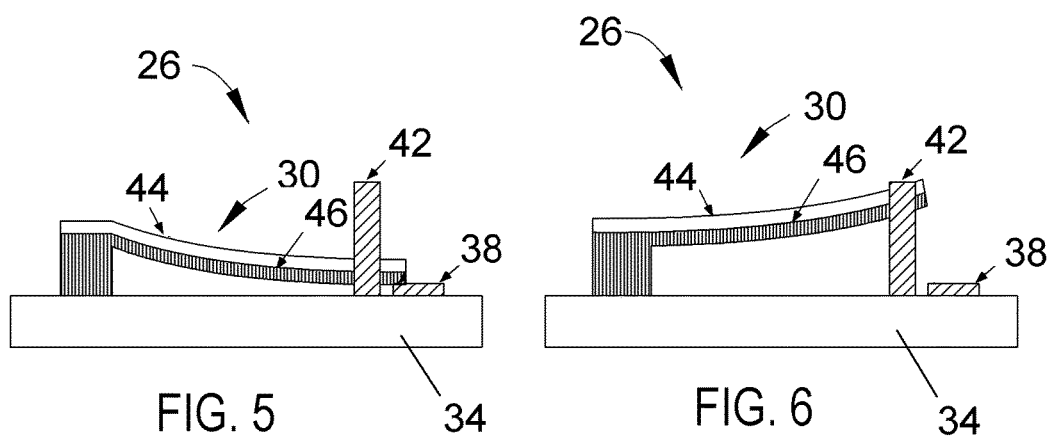
FIG. 5
FIG. 6

MODULES, SYSTEMS, AND METHODS FOR MONITORING ENVIRONMENTAL CONDITIONS

CROSS REFERENCE TO RELATED APPLICATIONS

This application claims the benefit of U.S. Provisional Application Ser. No. 62/284,808, filed Oct. 9, 2015, the contents of which are incorporated herein by reference.

BACKGROUND OF THE INVENTION

The present invention generally relates to electromechanical devices. More particularly, this invention relates to electromechanical devices and electromechanical device-based modules, systems, and methods capable of monitoring environmental conditions, such as physical, electromagnetic, thermal, and/or chemical parameters within an environment.

Wireless sensors are employed in a wide range of applications including supply-chain and logistics, industrial and structural monitoring, healthcare, homeland security, and defense. Such sensors used as nodes of wireless networks are capable of high reliability, efficiency, and performance and enable ambient intelligence, total visibility, and smart adaptive systems. Generally, it is desired to minimize the power dissipation, size, and cost of wireless sensors by minimizing their power requirements. Wireless sensors can be equipped with integrated miniature batteries or capacitors as a dedicated on-board power source, as well as configured for operation without a power storage device. In many applications, batteryless operation may be preferred or required due to lack of battery replacement feasibility or stringent cost, form factor, and lifetime requirements. One approach to address this need is scavenging energy from environmental sources such as ambient heat, radio and magnetic waves, vibrations, and light, provided that at least one of these parameters is adequately available. Another approach is to remotely power a sensor by inductive or electromagnetic coupling, in which case energy may be optionally stored on an integrated capacitor so that sensor operation may occur over a short period of time prior to the capacitor becoming completely discharged. Finally, there are sensors that do not need any external energy source for sensing because they operate based on chemical reactions or mechanical events resulting in a color change or another change in their properties that can be detected by visual inspection or with use of an electronic detection system. The latter types of wireless sensors are generally in the form of sensor labels and do not readily lend themselves to automation.

U.S. Pat. Nos. 7,495,368, 7,619,346, 7,827,660, 7,907,037, 8,487,508, and 8,677,802 and U.S. Patent Application Publication No. 2011/0009773 disclose the use of arrays of digital micro-electro-mechanical-system (MEMS) sensing devices that can be manufactured and packaged at wafer-level with integrated circuits to yield a sensing module. Sensing devices within an array can be configured to respond to different levels of an environmental condition or parameter to enable the module to cumulatively measure the environmental condition.

BRIEF DESCRIPTION OF THE INVENTION

The present invention provides modules, systems, and methods capable of monitoring environmental conditions, such as physical, electromagnetic, thermal, and/or chemical parameters within an environment, over extended periods of time using one or more electromechanical microstructures that deflect to open or close a contact in response to the parameter.

According to one aspect of the invention, an electromechanical sensing module is provided that includes a sensing device, means for producing a digital output with the sensing device, and an electronic circuitry interfacing with the sensing device so that the digital output thereof is used to generate a module output of the sensing module. The sensing device comprises a microstructure and at least one set of contacts configured for contact-mode operation with the microstructure. The microstructure is responsive to a parameter within an environment and to deflect toward or away from the contacts thereof in response to the parameter. The microstructure comprises a stack of layers comprising at least first and second layers of dissimilar first and second materials, respectively, wherein the first material has at least one property that changes as a result of curing of or absorption by the first material due to exposure to the parameter. A change in the property causes the microstructure to deflect in a direction normal to the stack as a result of the dissimilarity of the first and second materials, and the microstructure is configured to contact and close or break contact and open the contacts at a predetermined level of the parameter in the environment to produce the digital output.

According to a preferred aspect of the invention, the sensing device is one of a plurality of sensing devices of the module, and each sensing device is similarly equipped with a microstructure comprising a stack of layers of the first and second materials. However, the microstructures are configured to contact and close or break contact and open their respective contacts at different levels of the parameter in the environment, and each of the sensing devices produces a digital output when the microstructure thereof contacts and closes or breaks contact and opens the contacts thereof. Another preferred aspect is to interface the electronic circuitry with the sensing devices so that their digital outputs are used to generate the module output as a cumulative response of the sensing devices over time to the parameter in the environment.

According to another aspect of the invention, a method is provided for sensing and preferably also monitoring a parameter within an environment. The method entails the use of a sensing module that includes electronic circuitry and a sensing device on a substrate. The sensing device comprises a microstructure and at least one set of contacts configured for contact-mode operation with the microstructure. The microstructure comprises a stack of layers comprising at least first and second layers of dissimilar first and second materials, respectively, wherein the first material has at least one property that changes as a result of curing of or absorption by the first material due to exposure to the parameter. A change in the property causes the microstructure to deflect in a direction normal to the stack as a result of the dissimilarity of the first and second materials. By exposing the microstructure to the parameter within the environment, the property of the first material is sufficiently changed to cause the microstructure to deflect toward and close or deflect away from and open the contacts at a predetermined level of the parameter in the environment, with the result that a digital output is produced when the microstructure contacts and closes or breaks contact and opens the contacts thereof. Thereafter, the digital output of the sensing device is used to generate a module output of the sensing module.

Technical effects of sensors encompassed by the above preferably include the ability to continuously monitor environmental conditions over extended periods of time using electromechanical sensing devices configured for low power operation. Modules and methods that use one or more of the electromechanical sensing devices do not require a dedicated power source to sense and monitor a parameter within an environment, but instead utilize the parameter to generate a digital output. Such a module can be used in a network adapted to continuously monitor various environmental conditions, for example, exposure to heat, humidity, chemicals, or electromagnetic radiation, in a wide variety of applications including supply-chain management of perishable goods such as pharmaceuticals, chemicals, and fresh agriculture products, as well as environmental and industrial applications that benefit from detecting the presence of heat, chemicals, electromagnetic radiation, and chemicals.

Other aspects and advantages of this invention will be better appreciated from the following detailed description.

BRIEF DESCRIPTION OF THE DRAWINGS

FIGS. 3 and 4 schematically represent perspective and side views, respectively, of one of the electromechanical sensing devices shown in FIG. 2.

FIGS. 5 and 6 schematically represent the electromechanical sensing device of FIGS. 3 and 4 at opposite extremes of its operating range in response to a parameter in an environment exceeding a predetermined threshold.

DETAILED DESCRIPTION OF THE INVENTION

Figure 1:
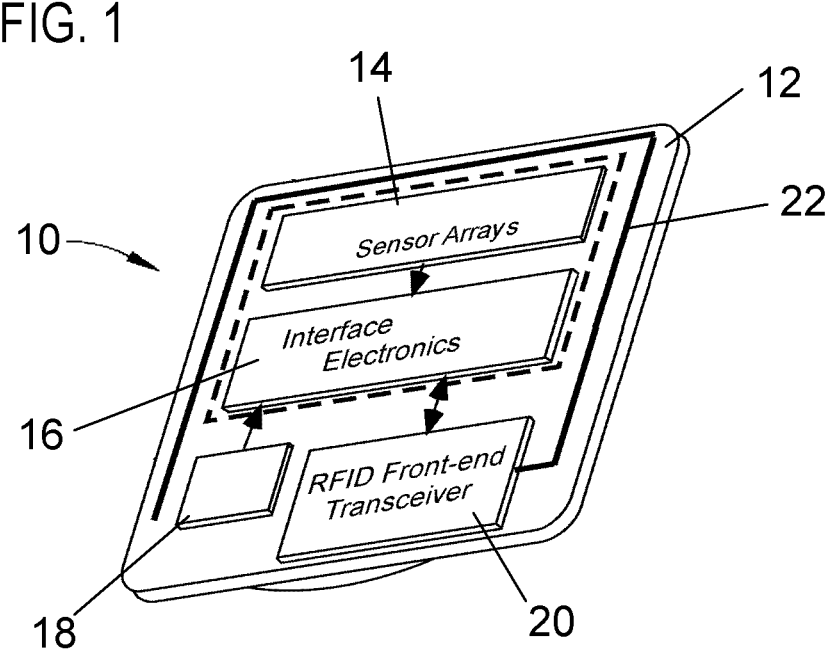
FIG. 1 schematically represents a perspective view of a module configured to monitor environmental conditions, such as physical, electromagnetic, thermal, and/or chemical parameters within an environment.

The following describes electromechanical devices, electromechanical device-based sensing modules, systems, and methods adapted to monitor environmental conditions, such as physical, electromagnetic, thermal, and/or chemical parameters within an environment. As used herein, the term "electromechanical device(s)" will be used to mean various types of miniaturized electromechanical systems, including micro-electromechanical systems (MEMS) and nano-electromechanical systems (NEMS), that are generally on a scale of less than a millimeter, incorporate both electronic and mechanical functionalities, and are produced by micromachining techniques such as bulk etching and/or surface thin-film etching. The electromechanical devices are configured as sensing devices that include at least one set of electrical contacts and a sensing element capable of moving to open or close the electrical contacts in response to an environmental parameter of interest. The sensing element is a microstructure, which as used herein refers to a structure that is preferably on a scale of less than a millimeter and formed by a micromachining technique. In preferred embodiments, the sensing element comprises a cantilevered beam made up of a stack of at least two dissimilar layers. Because the microstructures are represented as beams in the embodiments shown in the drawings, the term "beam" will be used in the following discussion though the invention will be understood to encompass other microstructures, including diaphragms. According to a preferred aspect, at least one of the dissimilar layers of the stack is formed of a material that has at least one property that changes when exposed to the parameter of interest, and in so doing causes the beam to deflect in a direction normal to the layers. The term bimorphic effect is commonly used to refer to such a bending effect in beams comprising two active layers, and this term will be used herein to more generally refer to a bending effect that a combination of dissimilar materials will cause in a beam (or other microstructure) in response to exposure to a parameter of interest. If the parameter is at a sufficiently high (threshold) level, the deflection of the beam is sufficient to open or close (depending on the operating mode of the sensing device) an electrical contact, which can serve to interrupt or allow, respectively, the transfer of a charge or electrical current, generation of an electrical voltage, or provide another form of output capable of corresponding to a digital signal. Contact between the beam and electrical contacts is referred to herein as a contact-mode switching function or contact-mode operation, and is preferably non-latching, in other words, other than as a result of its bending or deflection, the beam is not mechanically latched or otherwise secured to the contact.

In certain embodiments, the property change in the layer responsive to the parameter (hereinafter, the "sensing layer") alters the intrinsic stress of the sensing layer due to a curing or absorption process that occurs within the material of the sensing layer. For example, the sensing layer can be formed of an organic material, in which shrinkage or expansion or an increase in hardness of the material occurs that is caused by absorption of an environmental agent or by cross-linking of polymer chains within the material resulting from a chemical reaction that increases the average length and/or degree of cross-linking between constituent oligomers of the material. Such property changes in an organic material of the sensing layer can be induced by a number of different parameters that may exist or occur within an environment, nonlimiting examples of which include electromagnetic radiation (as nonlimiting examples, visible light, ultraviolet (UV) radiation, etc.), nuclear material radiation (gamma, beta, neutron), chemicals (as nonlimiting examples, gases, biological agents, etc.), temperature, and moisture (humidity). Because curing and absorption are commonly time-dependent processes, the property change in the material and the resultant response of the beam will depend on the level of the parameter within the environment and the total exposure to the parameter over time, referred to herein as a cumulative time-parameter level combination, for example, a cumulative time-temperature combination if heat is the parameter of interest. In most instances in which the property change in the sensing layer is the result of curing of an organic material in the sensing layer, the curing of the organic material will be irreversible and the response (deflection) of the beam will tend to be permanent. However, it is foreseeable that the response (deflection) of the beam could be temporary or reversible. For example, another layer within the stack of the beam could be formed of a material in which a property change can be induced to cause the beam to deflect in a direction normal to the layers but opposite the direction caused by the property change induced in the sensing layer by the property of interest. Alternatively, the curing of the material of the sensing layer could be reversible through a thermal or chemical treatment, causing the beam to at least partially return to its original orientation relative to the contacts. Similarly, in some instances absorption of an environmental agent, for example, a chemical, particles, moisture, etc., may be reversed by an appropriate desorption process, causing the beam to at least partially return to its original orientation relative to its contacts.

FIG. 1 schematically represents an example of an electromechanical device-based sensing module 10 in the form of a radio frequency identification (RFID) tag that may contain one or more arrays of electromechanical sensing devices comprising sensing elements of the types discussed above. FIG. 1 represents components of the module 10 as including a substrate 12 that carries a sensor package 14 containing the sensing devices. The module 10 is also represented as including electronic circuitry, represented in FIG. 1 as including, but not limited to interface electronics 16, an RFID front-end transceiver 20, and an antenna 22. The interface electronics 16 may be adapted to digitally process the outputs generated by the sensing elements of the package 14 to produce a module output that can be wirelessly transmitted by the transceiver 20. Alternatively, digital processing of the outputs of the sensing devices may not be necessary, in which case the interface electronics 16 may be adapted to simply receive the outputs of the sensing devices and relay these outputs to the transceiver 20 as the module output. Over any period of time during the operation of the module 10, the module output may be reported as a cumulative output indicating the responses of the sensing devices to the parameter of interest over time.

The substrate 12 of the module 10 can be of any suitable construction and material, such as those currently used in RFID and/or electronics technologies, and therefore will not be discussed in any detail here. Other than as noted below, the transceiver 20 and antenna 22 can also be of known construction and design, and therefore will only be discussed to the extent necessary for those skilled in the art to understand and implement various embodiments of the invention. Wireless communication between the module 10 and a suitable wireless interrogator (reader unit) may be through a passive RFID communications protocol, though other wireless protocols are also foreseeable. RFID standards (nonlimiting examples of which include NFC, ISO-18000-3, ISO 18000-6, UHF Gen2, ISO-15693) support simultaneous data collection by a single RFID interrogator from multiple modules having unique electronic ID codes, enabling more than one module 10 to be used in a monitoring system or network without requiring a battery. From the following discussion, it will become apparent that not all components depicted in FIG. 1 are required by the invention, and additional components could be added. As a nonlimiting example, FIG. 1 shows an optional battery 18 included in the module 10 to extend the wireless communication range as commonly known in the industry.

Figure 2:
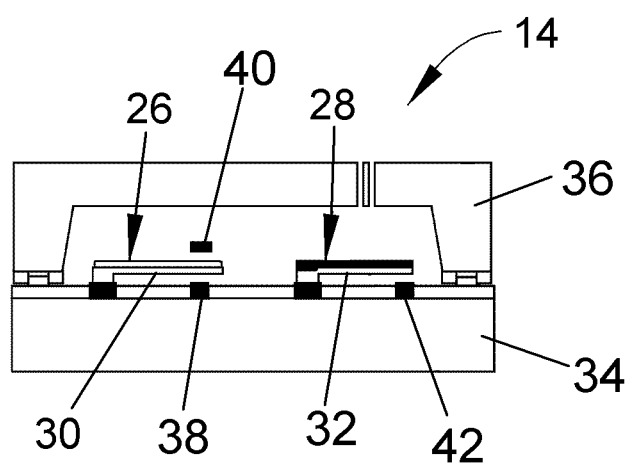
FIG. 2 schematically represents a package of the module of FIG. 1 in cross-section to reveal an array of electromechanical sensing devices within the package in accordance with a nonlimiting embodiment of the invention.

FIG. 2 is a schematic cross-sectional view of the sensor package 14 and shows the package 14 as containing one or more arrays of electromechanical sensing devices 26 and 28. While the sensor package 14 and sensing devices 26 and 28 will be discussed with reference to the module 10 represented in FIG. 1, technological aspects of the sensing devices 26 and 28 can be implemented with other configurations and types of sensor modules. The sensor package 14 and sensing devices 26 and 28 are preferably configured to provide certain advantages particular to the present invention. FIG. 2 represents the sensing devices 26 and 28 as fabricated on a substrate 34 and enclosed with a capping wafer 36 that provides access to the environment as may be required by the sensing devices 26 and/or 28. Though not shown, the interface electronics 16 may also be enclosed within the package 14.

Two sensing devices 26 and 28 are visible in FIG. 2, representative of two arrays of sensing devices 26 and 28 within the package 14. Each device 26 and 28 is represented as having a cantilevered beam 30 and 32, respectively, as a moving sensing element that comprises a stack of at least two dissimilar layers that cause the beams 30 and 32 to bend or deflect in response to an environmental parameter of interest. One end of each beam 30 and 32 is anchored to the substrate 34, as a nonlimiting example, a conventional CMOS circuit substrate in which the interface electronics 16 may also be fabricated. The opposite cantilevered end of each beam 30 and 32 is shown as being suspended in proximity to sets of contacts 38 and 42 or 40, respectively. The devices 26 and 28 and their beams 30 and 32 may be fabricated directly on the substrate 34, for example, an integrated circuit substrate (e.g., CMOS wafer) in which electronic devices of the module 10 can also be formed. An alternative is to fabricate the devices 26 and 28 and their beams 30 and 32 on a separate substrate that is subsequently electrically coupled or bonded to the substrate 34. It can be readily appreciated that the microstructures of the sensing devices 26 and 28 are simple and compatible with post-CMOS processing, and that very large, high-density arrays of the sensing devices 26 and 28 can be fabricated in a very small area. It is foreseeable that microstructures other than cantilevered beams could be employed that are capable of responding to an environmental parameter of interest by closing and/or opening electrical contacts.

As noted above, the individual responses of the beams 30 and 32 to an environmental parameter of interest may be referred to as bimorphic in the following discussion, though it should be understood that a strictly bimorphic microstructure is not required, in other words, the beams 30 and 32 do not require two active layers, and instead may have a single active layer or more than two active layers. While FIG. 2 represents the package 14 as containing two arrays of sensing devices 26 and 28, the package 14 could contain any number of arrays of the sensing devices 26 and 28 as well as additional sensing devices. The devices 26 and 28 can be configured to sense a wide variety of different environmental parameters to which the module 10 might be subjected, nonlimiting examples of which include electromagnetic radiation, nuclear particle radiation, chemicals, temperature, moisture/humidity, etc., as previously noted. Such capabilities can be achieved by using appropriate materials to form the beams 30 and 32 of the sensing devices 26 and 28, as will be understood from the following discussion.

FIGS. 3 through 6 schematically represent an isolated view of one of the sensing devices 26. In comparing the devices 26 and 28 represented in FIG. 2, it can be seen that a difference between the devices 26 and 28 is that the cantilevered end of the beam 30 is suspended between two sets of contacts 38 and 42, whereas the cantilevered end of the beam 32 is suspended above a single set of contacts 40. As such, the beam 30 may deflect in one of two directions to contact and close (or break contact and open) either set of contacts 38 and 42, whereas the beam 32 deflects in one direction to contact and close (or break contact and open) its contacts 40. Aside from this difference, the devices 26 and 28 may (though do not necessarily) have identical configurations, and therefore it should be understood that the following description of the device 26 is also applicable to the device 28 unless otherwise noted.

According to a preferred aspect of the invention, the sensing devices 26 and 28 are electromechanical structures that individually function as switches in response to one or more environmental parameters of the environment surrounding the module 10. As such, the sensing devices 26 and 28 are able to extract the energy needed for mechanical switching from the environment itself, thereby drastically reducing the power required to sense an environmental parameter. The mechanical switching operations of the arrays of sensing devices 26 and 28 are inherently digital and can be converted to an electrical signal using, for example, simple compact front-end circuitry. In a preferred embodiment, such circuitry is able to make use of a minimal number of transistors and may dissipate less than a few or tens of picowatts per sensing device 26 and 28, resulting in a total electrical power dissipation from the module 10 on the order of ones or tens of nanowatts when the module 10 is placed in the electrical field of a wireless interrogator (for batteryless operation) or powered (if needed or desired) by an on-module battery or other energy source (if included). As such, the sensing devices 26 and 28 are capable of operating in a manner that avoids the limitations of many existing IC-based sensors that are designed to operate in a batteryless configuration in which the sensor module is powered and its sensor output is transmitted through a wireless link when in the electrical field of a wireless interrogator (e.g., an RFID interrogator). Even if designed for lower power consumption, existing IC-based sensors are incompatible for continuous monitoring of environmental parameters over a period of a few years if relying on the energy capacity of existing miniature batteries. In combination, these features significantly decrease the complexity of the module 10 and its electronics to attain reductions in size, cost, and power not attainable with current commercial embodiments of environmental sensors.

With reference again to FIGS. 3 through 6, the cantilevered beam 30 of the sensing device 26 is represented as being fabricated to include two layers (films) 44 and 46 formed of dissimilar materials. In combination, the effect of the stack of layers 44 and 46 is to cause the beam 30 to bend when subjected to the environmental parameter as a result of a property of the material of at least one of the layers 44 and 46 changing relative to the corresponding property of the other layer 44 or 46 within the stack. As noted above, a preferred aspect of the invention is that at least one of the layers 44 and 46 is a sensing layer 44/46 that is formed of a material having one or more properties that change as a result of curing of or absorption by the material due to exposure to a parameter of interest in the environment to which the device 26 is subjected. For convenience, the layer 44 represented in the drawings will be referred to as the sensing layer 44 and the layer 46 will be referred to as a second layer 46, though it should be understood that the locations and number of the sensing and second layers 44 and 46 may be changed on or within the beam 30.

Nonlimiting examples of materials capable of exhibiting such changes include organic materials. If the material of the sensing layer 44 is curable, nonlimiting examples of suitable organic materials include thermoplastic and thermoset materials that undergo curing when subjected to an environmental parameter that acts as a curing stimulus to the organic material, nonlimiting examples of which include electromagnetic radiation, chemicals, temperature, moisture/humidity, etc. Particular organic materials believed to be suitable for use include epoxies, silicone compounds, etc.

Suitable materials for the second layer 46 (and, in some cases, additional layers) may depend on the composition of the material of the sensing layer 44. In many cases, suitable materials for the second layer 46 may be essentially inert, which as used herein refers to materials that undergo little if any curing or absorption relative to the sensing layer 44 when subjected to the environmental parameter (i.e., the stimulus that induces a property change in the material of the sensing layer 44). Particular inert materials include metals (including metal alloys), silicon, silicon-germanium alloys, electrically non-conductive materials such as silicon dioxide and silicon nitride, and certain polymers. The use of an inert material for the second layer 46 is suitable for circumstances in which the deflection of the beam 30 is not intended to be reversible and the response (deflection) of the beam 30 is to be permanent. However, in situations in which the response (deflection) of the beam 30 is desired to be temporary or reversible, the property change in the sensing layer 44 may be reversible, for example, through a thermal or chemical treatment, causing the beam 30 to at least partially return to its original orientation relative to its contacts 38 and 42. Alternatively, the second layer 46 (or another layer within the stack) of the beam 30 could be formed of a material in which a property change can be induced to cause the beam to deflect in a direction normal to the layers 44 and 46, but opposite the direction caused by the property change induced in the sensing layer 44 by the parameter of interest. Alternatively, it is foreseeable that the beam 30 could be reset by using one or more sensing layers 44 and one or more second layers 46 that in combination are able to at least partially reverse the deflection of the beam 30 by exposing the layers 44 and 46 to one or more different environmental parameters.

Figure 7:
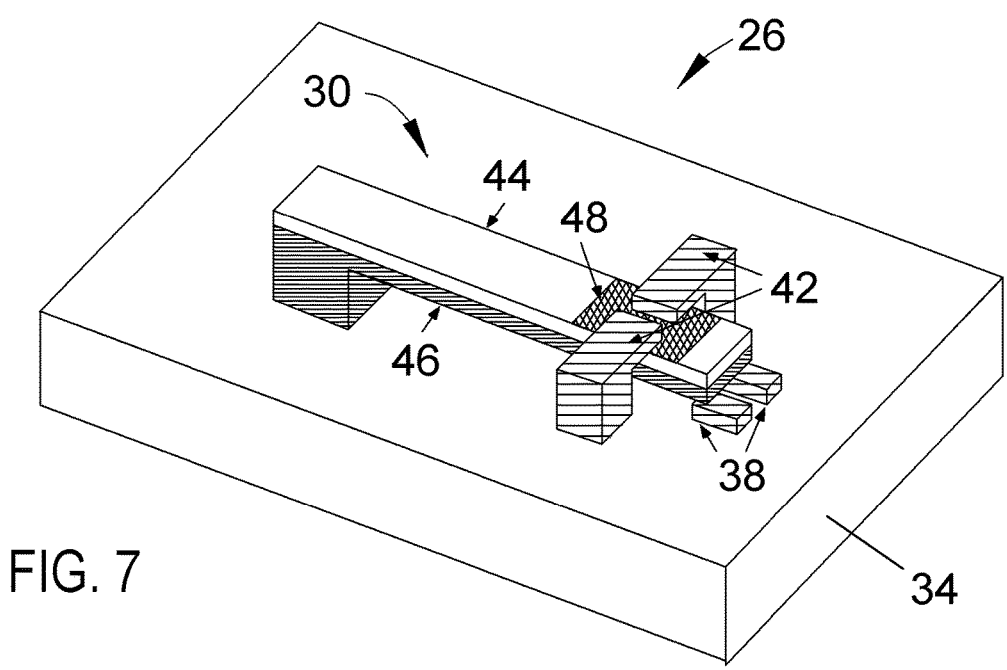
FIG. 7 represents a perspective view of another electromechanical sensing device that can be used in the package of FIG. 2 in accordance with a nonlimiting embodiment of the invention.

As understood by those skilled in the art, the beam 30 could include additional layers/films, such as adhesion layers to promote adhesion of the layers 44 and 46 to each other, and stress compensation layers to improve the distribution of any processing-induced strain within the beam 30. It is within the scope of the invention to pattern some of the layers that form the beam 30 for the purpose of modifying their individual properties, including their response to the environmental parameter being sensed, temperature, humidity, chemicals, electromagnetic and particle radiations, UV light, and/or other environmental conditions. Because the cantilevered end of the beam 30 electrically connects its contacts 38 and/or 42, at least one of the layers of the beam 30 (preferably other than the sensing layer 44) may be formed of an electrical conductor. Alternatively, both layers 44 and 46 could be electrically non-conductive materials, in which case the beam 30 can include a separate electrically conductive layer 48 for making contact with either of the contacts 38 or 42, as represented in FIG. 7. As such, it should be understood that the beam 30 may comprise layers of various materials that, in combination, yield a bimorphic (bending) effect on the beam 30.

While the layers 44 and 46 are shown as being positioned one atop the other to yield a vertical stack (which as used herein means that the layers 44 and 46 are stacked in a direction normal to the surface of the substrate 34), it should be understood that the layers 44 and 46 could be arranged side-by-side to yield a horizontal (lateral) stack (again, relative to the surface of the substrate 34). In either case, the beam 30 moves in response to the external environmental parameter (stimulus) relative to its contacts 38 and 42, in one operating mode toward one of the sets of contacts 38 or 42 if the beam 30 is initially separated from both sets of contacts 38 and 42 (each set initially constituting an open electrical path), or in a second operating mode away from one of the sets of contacts 38 or 42 if the beam 30 initially contacts that set of contacts 38 or 42 (which therefore creates an initially closed electrical path). Depending on the operating mode, closure or opening of the contacts 38 or 42 results from the environmental parameter having been at or above a sufficient level for a sufficient amount of time to cause a sufficient degree of curing or absorption in the sensing layer 44 that leads to bending of the beam 30 and contact with the contacts 38 or 42. The direction of the beam deflection is determined by the location of the sensing layer 44 among the layers 44 and 46 within the stack and the response of the sensing layer 44 to the environmental parameter resulting from the particular property changed by curing or absorption.

FIGS. 5 and 6 represent the sensing device 26 at opposite extremes of its operating range corresponding to two threshold conditions. In the embodiment of FIG. 5, the motion of the beam 30, initially separated from both sets of contact 38 and 42 causes the beam 30 to contact the lower set of contacts 38 to form a closed electrical path. (Alternatively, FIG. 5 could be described as depicting the second operating mode in which the beam 30 is initially in contact with the lower contacts 38 to form a closed electrical path, and the effect of the parameter would be to cause the beam 30 to deflect upward, breaking contact to open the contacts 38 and create an open electrical path.) For example, the condition represented in FIG. 5 could be the result of the upper sensing layer 44 having expanded as a result of undergoing curing when exposed to an environmental parameter of interest. In the embodiment of FIG. 6, the motion of the beam 30 causes the beam 30 to contact the upper set of contacts 42 to form a closed electrical path. (Alternatively, FIG. 6 could be described as depicting the second operating mode in which the beam 30 is initially in contact with the upper contacts 42 to form a closed electrical path, and the effect of the parameter would be to cause the beam 30 to deflect downward, breaking contact to open the contacts 42 and create an open electrical path.) For example, the condition represented in FIG. 6 could be the result of the upper sensing layer 44 having contracted as a result of undergoing curing when exposed to an environmental parameter of interest. Either the contacts 38 and 42 or the beam 30 may be connected to a power source, for example, the battery 18 of FIG. 1 or a capacitor (which may be an integrated component of the interface electronics 16), such that closure of either set of contacts 38 or 42 serves to transfer a charge or electrical current, generate an electrical voltage, or provide another form of output capable of corresponding to a digital signal.

The sensitivity of the beams 30 and 32, in other words, the extent to which the cantilevered ends of the beams 30 and 32 (adjacent the contacts 38, 40, and/or 42) will deflect when subjected to a given level of the parameter, will depend on the compositions of the layers 44 and 46 (including any additional layers) that make up the beams 30 and 32 and certain geometric characteristics of the beams 30 and 32. The sensitivity of the beam 30 or 32 of any given device 26 or 28 can be analytically predicted and controlled based on structure geometries and material properties, including the thickness and the Young's modulus of elasticity of each layer 44 and 46. In this manner, each device 26 and 28 can be configured to have a beam 30 or 32 that performs a switching function at a different level (threshold) of the parameter relative to the beams 30 and 32 of other devices 26 and 28 of the module 10. Furthermore, an array of the sensing devices 26 and 28 can contain devices 26 and 28 whose beams 30 and 32 are intentionally of different lengths, with longer beams 30 and 32 being more sensitive to the parameter and resulting in contact with one of the sets of contacts 38, 40, and 42 at progressively smaller parameter changes with increasing beam lengths. Scaling of the feature sizes of the beams 30 and 32 improves the achievable measurement resolution in addition to the die size reduction. While the movement of the cantilevered end of a beam 30 or 32 relative to its contacts 38 and 42 or 40 will depend in part on the length of the beam 30/32, sensitivity is independent of the beam width such that the widths of the beams 30 and 32 within a device array can be minimized to reduce the size of the array to the extent that manufacturing reliability allows. If an array contains a large number of sensing devices 26 and/or 28, the package 14 of the module 10 can be fabricated to have a large redundancy of sensing devices 26 and/or 28 that enhances yield without any noticeable cost penalty. For example, significant yield enhancements can be achieved by fabricating the sensing devices 26 and 28 in large arrays, and then selecting only a subset of devices 26 and/or 28 from each array for actual use by the module 10 to perform the sensing function.

As previously noted, the closing or opening of the contacts 38 and 40 or 42 of a device 26 or 28 by its beam 30 or 32 provides a direct indication of a cumulative time-level combination based on the duration that the beam 30 or 32 was subjected to the environmental parameter at or above a level that initiates a property change (e.g., as a result of curing, absorption, etc.) of the organic material. As such, the module 10 is able to process the digital outputs of its devices 26 and 28 to not only generate data corresponding to the level of the parameter (for example, temperature), but also data corresponding to the duration of that parameter. The module 10 or the system/network with which it communicates may also be operable to combine or integrate the level and duration data obtained from its different devices 26 and 28 according to a mathematical model.

As a result of the responses of their beams 30 and 32 to an environmental parameter resulting in an open or closed electric contact that subsists regardless of subsequent levels of the parameter within the environment, the sensing devices 26 and 28 of the module 10 are effectively store digital data generated by the devices 26 and 28 even if there is no external power supplied to the module 10 for extended periods of time. In this manner, the module 10 is particularly well suited for long-term tracking and recording of one or more environmental parameters.

From the foregoing, it will be appreciated that modules of the type described above can be adapted for use in a wide variety of applications that can be implemented within a wireless monitoring system. While the invention has been described in terms of particular embodiments, it is apparent that other forms could be adopted by one skilled in the art. For example, the physical configurations and uses of the module 10, devices 26 and 28, beams 30 and 32, etc., could differ from those shown and described, and materials and processes other than those noted could be use. Therefore, the scope of the invention is to be limited only by the following claims.

The invention claimed is:

1. An electromechanical sensing module comprising:
   a sensing device on a substrate, the sensing device comprising a microstructure and at least one set of contacts located on the substrate and configured for contact-mode operation with the microstructure, the microstructure being responsive to a parameter within an environment and to deflect toward or away from the contacts thereof in response to the parameter in the environment, the microstructure comprising a stack of layers comprising at least first and second layers of dissimilar first and second materials, respectively, the first material having at least one property that undergoes a change as a result of a time-dependent process in which curing of or absorption by the first material occurs due to exposure to the parameter over a period of time and the first material has a curing time or absorption time while exposed to the parameter such that the change in the property depends on a duration of the period of time during which the first material is exposed to the parameter, the curing of or the absorption by the first material during the time period indicates the parameter within the environment, the change in the property causes the microstructure to deflect in a direction normal to the stack as a result of the dissimilarity of the first and second materials, and the microstructure deflects an amount depending on the duration that the first material was exposed to the parameter in the environment, the microstructure being configured to contact and close or break contact and open the contacts after an amount of time depending on the parameter;

means for producing a digital output when the microstructure contacts and closes the contacts thereof; and an electronic circuitry interfacing with the sensing device so that the digital output of the sensing device is used to generate a module output of the sensing module.

2. The electromechanical sensing module according to claim 1, wherein the parameter is at least one parameter chosen from the group consisting of electromagnetic radiation, a chemical, temperature, moisture, and nuclear particle radiation.

3. The electromechanical sensing module according to claim 1, wherein the first material is a curable organic material and the property of the first material changes as a result of the first material curing to form a polymeric material containing cross-linked polymer chains.

4. The electromechanical sensing module according to claim 1, wherein the property of the first material changes as a result of absorbing a chemical, particles, or moisture.

5. The electromechanical sensing module according to claim 1, wherein the change in the at least one property of the first material is irreversible.

6. The electromechanical sensing module according to claim 1, wherein the change in the at least one property of the first material is reversible.

7. The electromechanical sensing module according to claim 1, wherein the second material is an electrical conductor that electrically connects the contacts of the sensing device when the microstructure contacts and closes the contacts.

8. The electromechanical sensing module according to claim 1, wherein the second material is electrically non-conductive and the microstructure further comprises an electrical conductor layer that electrically connects the contacts of the sensing device when the microstructure contacts and closes the contacts.

9. The electromechanical sensing module according to claim 1, wherein the microstructure is a cantilevered beam.

10. The electromechanical sensing module according to claim 9, wherein the beam is a bimorph beam and the stack of layers consists of the first and second layers and optionally one or more adhesion layers therebetween.

11. The electromechanical sensing module according to claim 1, wherein the sensing device is a first sensing device and the module comprises a plurality of additional sensing devices on the substrate, each of the additional sensing devices comprises a microstructure and at least one set of contacts configured for contact-mode operation with the microstructure thereof, the microstructures are configured to contact and close or break contact and open their respective contacts depending on the duration that the first materials thereof were exposed to the parameter in the environment, the microstructure of each of the additional sensing devices comprises a stack of layers of the first and second materials so that a change in the property of the first material causes the microstructures of the additional sensing devices to deflect in a direction normal to the stack thereof as a result of the dissimilarity of the first and second materials, and each of the additional sensing devices produces a second digital output when the microstructure thereof contacts and closes or breaks contact and opens the contacts thereof.

12. The electromechanical sensing module according to claim 11, wherein the electronic circuitry interfaces with the additional sensing devices to digitally process the second digital outputs of the additional sensing devices and generate the module output therefrom over time as a cumulative output indicating the responses of the additional sensing devices to the parameter in the environment over time.

13. The electromechanical sensing module according to claim 11, wherein the interface electronics interfaces with the additional sensing devices to receive the second digital outputs of the additional sensing devices and relay the second digital outputs as the module output over time as a cumulative output indicating the responses of the additional sensing devices to the parameter in the environment over time.

14. The electromechanical sensing module according to claim 11, wherein the electronic circuitry communicates with a subset of the additional sensing devices, the second digital outputs of only the subset of additional sensing devices are processed by the electronic circuitry to generate the module output of the sensing module, and a remainder of the additional sensing devices not part of the subset of additional sensing devices are responsive to durations of exposure to the parameter in the environment outside a range defined by durations of exposure to the parameter in the environment to which the subset of additional sensing devices are responsive.

15. The electromechanical sensing module according to claim 11, wherein the microstructures of the sensing devices are responsive to the changes in the parameter in the environment without any electrical power supplied to the microstructures.

16. The electromechanical sensing module according to claim 1, further comprising a radio frequency identification link operable to wirelessly transmit the module output.

17. The electromechanical sensing module according to claim 1, wherein the microstructure is further configured to contact and close or break contact and open the contacts due at least in part to the parameter being at or above a predetermined level in the environment that initiates the change in the property.

18. An electromechanical sensing module comprising:
a plurality of sensing devices on a substrate, each sensing device comprising a cantilevered beam and at least one set of contacts located on the substrate and configured for non-latching contact-mode operation with the beam, the beam of each sensing device being responsive to a parameter within an environment and to deflect toward or away from the contacts thereof in response to the parameter in the environment, the beam of each sensing device comprising a stack of layers comprising at least first and second layers of dissimilar first and second materials, respectively, the first material being a curable material that has at least one property that undergoes a change as a result of a time-dependent process in which curing of the curable material occurs due to exposure to the parameter over a period of time and the first material has a curing time while exposed to the parameter such that the change in the property depends on a duration of the period of time during which the first material is exposed to the parameter, the curing of the first material during the time period indicates the parameter within the environment, the change in the property causes the beam to deflect in a direction normal to the stack as a result of the dissimilarity of the first and second materials, and the microstructure deflects an amount depending on the duration that the first material was exposed to the parameter in the environment, the beams being configured to contact and close or break contact and open their respective contacts after an amount of time depending on the parameter;

means for producing a digital output when any one of the beams contacts and closes or breaks contact and opens the contacts thereof; and an electronic circuitry interfacing with the sensing devices so that the digital outputs of the sensing devices are used to generate a module output of the sensing module.

19. The electromechanical sensing module according to claim 18, wherein the parameter is at least one parameter chosen from the group consisting of electromagnetic radiation, a chemical, temperature, moisture, and nuclear particle radiation.

20. The electromechanical sensing module according to claim 18, wherein the curable material is an organic material that cures to form a polymeric material containing cross-linked polymer chains.

21. The electromechanical sensing module according to claim 18, wherein the curing of the curable material is irreversible.

22. The electromechanical sensing module according to claim 18, wherein the curing of the curable material is reversible.

23. The electromechanical sensing module according to claim 18, wherein the electronic circuitry interfaces with the sensing devices to digitally process the digital outputs of the sensing devices and generate the module output therefrom over time as a cumulative output indicating the responses of the sensing devices to the parameter in the environment over time.

24. The electromechanical sensing module according to claim 18, wherein the electronic circuitry interfaces with the sensing devices to receive the digital outputs of the sensing devices and relay the digital outputs as the module output over time as a cumulative output indicating the responses of the sensing devices to the parameter in the environment over time.

25. The electromechanical sensing module according to claim 18, wherein the electronic circuitry communicates with a subset of the sensing devices, the digital outputs of only the subset of sensing devices are processed by the electronic circuitry to generate the module output of the sensing module, and a remainder of the sensing devices not part of the subset of sensing devices are responsive to durations of exposure to the parameter in the environment outside a range defined by durations of exposure to the parameter in the environment to which the subset of sensing devices are responsive.

26. The electromechanical sensing module according to claim 18, wherein the module is a first electromechanical sensing module of a monitoring system and the monitoring system comprises a plurality of additional electromechanical sensing module.

27. The electromechanical sensing module according to claim 18, wherein the microstructure is further configured to contact and close or break contact and open the contacts due at least in part to the parameter being at or above a predetermined level in the environment that initiates the change in the property.

28. An electromechanical sensing module comprising:

a plurality of sensing devices on a substrate, each sensing device comprising a cantilevered beam and at least one set of contacts located on the substrate and configured for non-latching contact-mode operation with the beam, the beam of each sensing device being responsive to a parameter within an environment and to deflect toward or away from the contacts thereof in response to the parameter in the environment, the beam of each sensing device comprising a stack of layers comprising at least first and second layers of dissimilar first and second materials, respectively, the first material having at least one property that undergoes a change as a result of a time-dependent process in which absorption by the first material occurs due to exposure to the parameter over a period of time and the first material has an absorption time while exposed to the parameter such that the change in the property depends on a duration of the period of time during which the first material is exposed to the parameter, the absorption by the first material during the time period indicates the parameter within the environment, the change in the property causes the beam to deflect in a direction normal to the stack as a result of the dissimilarity of the first and second materials, and the microstructure deflects an amount depending on the duration that the first material was exposed to the parameter in the environment, the beams being configured to contact and close or break contact and open their respective contacts after an amount of time depending on the parameter;

means for producing a digital output when any one of the beams contacts and closes or breaks contact and opens the contacts thereof; and an electronic circuitry interfacing with the sensing devices so that the digital outputs of the sensing devices are used to generate a module output of the sensing module.

29. The electromechanical sensing module according to claim 28, wherein the parameter is at least one parameter chosen from the group consisting of electromagnetic radiation, a chemical, temperature, moisture, and nuclear particle radiation.

30. The electromechanical sensing module according to claim 28, wherein the electronic circuitry interfaces with the sensing devices to digitally process the digital outputs of the sensing devices and generate the module output therefrom over time as a cumulative output indicating the responses of the sensing devices to the parameter in the environment over time.

31. The electromechanical sensing module according to claim 28, wherein the electronic circuitry interfaces with the sensing devices to receive the digital outputs of the sensing devices and relay the digital outputs as the module output over time as a cumulative output indicating the responses of the sensing devices to the parameter in the environment over time.

32. The electromechanical sensing module according to claim 28, wherein the electronic circuitry communicates with a subset of the sensing devices, the digital outputs of only the subset of sensing devices are processed by the electronic circuitry to generate the module output of the sensing module, and a remainder of the sensing devices not part of the subset of sensing devices are responsive to durations of exposure to the parameter in the environment outside a range defined by durations of exposure to the parameter in the environment to which the subset of sensing devices are responsive.

33. The electromechanical sensing module according to claim 28, wherein the module is a first electromechanical sensing module of a monitoring system and the monitoring system comprises a plurality of additional electromechanical sensing module.

34. The electromechanical sensing module according to claim 28, wherein the microstructure is further configured to contact and close or break contact and open the contacts due at least in part to the parameter being at or above a predetermined level in the environment that initiates the change in the property.

35. A method of sensing a parameter within an environment, the method comprising the steps of:
providing a sensing module comprising electronic circuitry and a sensing device on a substrate, the sensing device comprising a microstructure and at least one set of contacts located on the substrate and configured for contact-mode operation with the microstructure, the microstructure comprising a stack of layers comprising at least first and second layers of dissimilar first and second materials, respectively, the first material having at least one property that undergoes a change as a result of a time-dependent process in which curing of or absorption by the first material occurs due to exposure to the parameter over a period of time and the first material has a curing time or absorption time while exposed to the parameter such that the change in the property depends on a duration of the period of time during which the first material is exposed to the parameter, the curing of or the absorption by the first material during the time period indicates the parameter within the environment, the change in the property causes the microstructure to deflect in a direction normal to the stack as a result of the dissimilarity of the first and second materials, and the microstructure deflects an amount depending on the duration that the first material was exposed to the parameter in the environment;
exposing the microstructure to the parameter within the environment to cause the microstructure to deflect in a first direction toward and close or deflect away from and open the contacts after an amount of time depending on the parameter;
producing a digital output when the microstructure contacts and closes or breaks contact and opens the contacts thereof; and
using the digital output of the sensing device to generate a module output of the sensing module.

36. The method according to claim 35, wherein the parameter is at least one parameter chosen from the group consisting of electromagnetic radiation, a chemical, temperature, and moisture.

37. The method according to claim 35, wherein the first material is a curable organic material and the property of the first material changes as a result of the first material curing to form a polymeric material containing cross-linked polymer chains.

38. The method according to claim 35, wherein the property of the first material changes as a result of absorbing a chemical, particles, or moisture.

39. The method according to claim 35, wherein the change in the at least one property of the first material is irreversible.

40. The method according to claim 35, wherein the change in the at least one property of the first material is reversible.

41. The method according to claim 35, further comprising treating the sensing device to cause the microstructure to deflect in a second direction opposite the first direction.

42. The method according to claim 41, wherein the treating step comprises at least partially reversing the change in the at least one property of the first material.

43. The method according to claim 41, wherein the treating step comprises changing a property of the second material of the second layer.

44. The method according to claim 35, wherein the sensing device is a first sensing device and the module comprises a plurality of additional sensing devices on the substrate, each of the additional sensing devices comprises a microstructure and at least one set of contacts configured for contact-mode operation with the microstructure thereof, the microstructures are configured to contact and close or break contact and open their respective contacts depending on the duration that the first materials thereof were exposed to the parameter in the environment, the microstructure of each of the additional sensing devices comprises a stack of layers of the first and second materials so that a change in the property of the first material causes the microstructures of the additional sensing devices to deflect in a direction normal to the stack thereof as a result of the dissimilarity of the first and second materials, and each of the additional sensing devices produces a second digital output when the microstructure thereof contacts and closes or breaks contact and opens the contacts thereof.

45. The method according to claim 44, wherein the electronic circuitry generates the module output by individually digitally processing the second digital outputs of the additional sensing devices and generate the module output therefrom over time as a cumulative output indicating the responses of the additional sensing devices to the parameter in the environment over time.

46. The method according to claim 44, wherein the electronic circuitry generates the module output over time as a cumulative output of the additional sensing devices to the parameter in the environment over time.

47. The method according to claim 44, wherein the second digital outputs of only a subset of the additional sensing devices are processed to generate the module output of the sensing module, and a remainder of the additional sensing devices is ignored by the electronic circuitry when generating the module output.

48. The method according to claim 44, further comprising wirelessly transmitting the module output with a radio frequency identification link.

49. The method according to claim 44, wherein the module is a first electromechanical sensing module of a monitoring system and the monitoring system receives the module output of the first electromechanical sensing module and module outputs of a plurality of additional electromechanical sensing module.

50. The method according to claim 35, wherein exposing the microstructure to the parameter within the environment to at least partially cure the first material also causes the microstructure to deflect in the first direction toward and close or deflect away from and open the contacts due at least in part to the parameter being at or above a predetermined level in the environment that initiates the change in the property.

\* \* \* \* \*